United States Patent
Merkin

(10) Patent No.: US 7,039,743 B2
(45) Date of Patent: May 2, 2006

(54) SYSTEM AND METHOD OF RETIRING EVENTS UPON DEVICE REPLACEMENT

(75) Inventor: Cynthia M. Merkin, Georgetown, TX (US)

(73) Assignee: Dell USA, L.P., Round Rock, TX (US)

( * ) Notice: Subject to any disclaimer, the term of this patent is extended or adjusted under 35 U.S.C. 154(b) by 301 days.

(21) Appl. No.: 10/139,657

(22) Filed: May 6, 2002

(65) Prior Publication Data

US 2003/0208649 A1    Nov. 6, 2003

(51) Int. Cl.
    *G06F 13/00*    (2006.01)
(52) U.S. Cl. ............... 710/302; 710/301; 710/100; 710/268; 702/127
(58) Field of Classification Search ........ 710/301–304, 710/100, 268
    See application file for complete search history.

(56) References Cited

U.S. PATENT DOCUMENTS

| | | | |
|---|---|---|---|
| 5,619,724 A | 4/1997 | Moore | 395/829 |
| 5,689,416 A | 11/1997 | Shimizu et al. | 364/185 |
| 6,167,538 A | 12/2000 | Neufeld et al. | 714/47 |
| 6,272,584 B1 | 8/2001 | Stancil et al. | 710/241 |
| 6,289,456 B1 * | 9/2001 | Kuo et al. | 713/200 |
| 6,542,266 B1 * | 4/2003 | Phillips et al. | 370/395.1 |
| 6,614,811 B1 * | 9/2003 | Alaimo et al. | 370/498 |
| 6,633,761 B1 * | 10/2003 | Singhal et al. | 455/436 |
| 6,640,246 B1 * | 10/2003 | Gary et al. | 709/223 |
| 2003/0163275 A1 * | 8/2003 | Farrell et al. | 702/127 |
| 2003/0167367 A1 * | 9/2003 | Kaushik et al. | 710/302 |

OTHER PUBLICATIONS

U.S. Appl. No. 10/008,099, filed Nov. 9, 2001, by Merkin.

* cited by examiner

*Primary Examiner*—Rehana Perveen
*Assistant Examiner*—Kim T. Huynh
(74) *Attorney, Agent, or Firm*—Baker Botts L.L.P.

(57) ABSTRACT

An information handling system is disclosed that retires events upon device replacement. The system has several devices of one or more types and each device includes nonvolatile memory. A unique identifier, for devices of that type, is stored in the nonvolatile memory of each device. A first memory segment stores an event log. The event log has entries that identify system events. A second memory segment stores identifiers of devices that correspond to an entry of the event log. At least one of the corresponding devices is removable. The system detects the removal of the devices and, in response, removes any entries in the event log that correspond only to identifiers of one or more devices that have been removed.

21 Claims, 3 Drawing Sheets

SYSTEM AND METHOD OF RETIRING EVENTS UPON DEVICE REPLACEMENT

TECHNICAL FIELD

The present disclosure relates generally to the field of electronic device monitoring and, more particularly, to a system and method of retiring events upon device replacement.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include subsystems that monitor the physical health characteristics of system components, such as temperature, voltage, fans, power supplies, and chassis intrusion. Such monitoring subsystems can also monitor hardware-detected faults in the operation of system components. Conventional monitoring subsystems construct and maintain a listing of events. For example, in a server computer system, an event could be added when a particular voltage in the system rises above or falls below specified parameters. As another example, in a server computer system, an event could be added when a particular memory device has a failed parity check. The listing of events is often referred to as a System Event Log. A monitoring subsystem may also maintain a listing of the number and type of monitoring and control features offered by the information handling system. Such a listing is sometimes referred to as Sensor Data Records or SDRs. A software program can read those listings and provide a user with information regarding the type of monitoring that a particular information handling system conducts and the results of that monitoring.

An information handling system can also include indicators that are driven by the data maintained in the System Event Log. For example, the front face of a computer system can include a fault Light Emitting Diode (LED) that is turned on when the System Event Log includes an error. As another option, the front face of a computer system can include a Liquid Crystal Display (LCD) that provides more extensive information about particular errors recorded in the System Event Log. Some systems may contain both an LED and an LCD to allow both general and specific communication of fault status. An indicator can be inaccurate if it either does not indicate an error that is currently present in the system (a false negative) or does indicate an err or that is not currently present in the system (a false positive).

An information handling system can contain removable components. For example, a computer system might contain memory modules connected to sockets that can be removed and replaced with different memory modules. Such components are sometimes referred to as Field Replaceable Units or FRUs. Other examples of FRUs are processors and motherboards. An FRU may be removed or replaced for several reasons: to fix an error, to upgrade a capability, or to reduce power consumption.

Some FRUs are designed to allow replacement only when the information handling system is not functioning. In other words, as one example the system is turned off, a current FRU is removed, and a new FRU is connected. As another example, the system is turned off and the current FRU is removed, but no new FRU is connected. When the information handling system is turned back on, the new FRU can communicate with the other components of the system. Removing such an FRU while the system is functioning can result in errors.

Some FRUs are designed to allow replacement when the information handling system is functioning without generating errors. Such FRUs are often referred to as hot-pluggable. Hot-pluggable FRUs are connected to the rest of the system such that the system as a whole recognizes the removal of the FRU and configures itself to operate without whatever functionality that FRU provided. Hot pluggable FRUs are also connected to the rest of the system such that the system as a whole recognizes the addition of an FRU and configures itself to operate with whatever functionality that FRU now provides.

FRUs can include a unique identifier, such as a device serial number, that can be communicated to a system in which that FRU is resident. The identifier may be unique only with respect to a particular type of FRU. For example, a memory module can have a serial number that is not shared by any other memory module, but is shared by a processor.

The System Error Log can contain entries for an FRU that is removed either while the system is turned off or while the system is operating. If an FRU that had been the source of an error event is removed and replaced, it is important that the system error log accurately indicate the events associated with the current FRU rather than its predecessor.

SUMMARY

In accordance with the present disclosure, an information handling system and method are provided for retiring events upon device replacement. The system has several devices of one or more types and each device includes nonvolatile memory. A unique identifier, for devices of that type, is stored in the nonvolatile memory of each device. A first memory segment stores an event log. The event log has entries that identify system events. A second memory segment stores identifiers of devices that correspond to an entry of the event log. At least one of the corresponding devices is removable. The system detects the removal of the devices and, in response, removes any entries in the event log that correspond only to identifiers of one or more devices that have been removed. In a more specific implementation, the second memory segment is adjacent to the first memory segment and the event log entries includes device identifiers. In an alternative implementation, the event log entries identify device locations and the second memory segment stores the device identifier, if there is one, for each device location.

A technical advantage of the present disclosure is that hardware-detected events are stored in a log. Another technical advantage of the present disclosure is that hardware-detected events associated with particular devices can be removed automatically from the log when those devices are removed from the information handling system. Another technical advantage of the present disclosure is that a hardware-detected event associated with an empty device location can be removed when a device is detected in that location. Other technical advantages will be apparent to those of ordinary skill in the art in view of the following specification, claims, and drawings. Various embodiments and implementations of the present disclosure obtain only a subset of the advantages set forth. No one advantage is critical to the present disclosure. For example, one embodiment of the present disclosure may only provide the advantage of storing hardware-detected events in a log, while other embodiments may provide several of the advantages.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
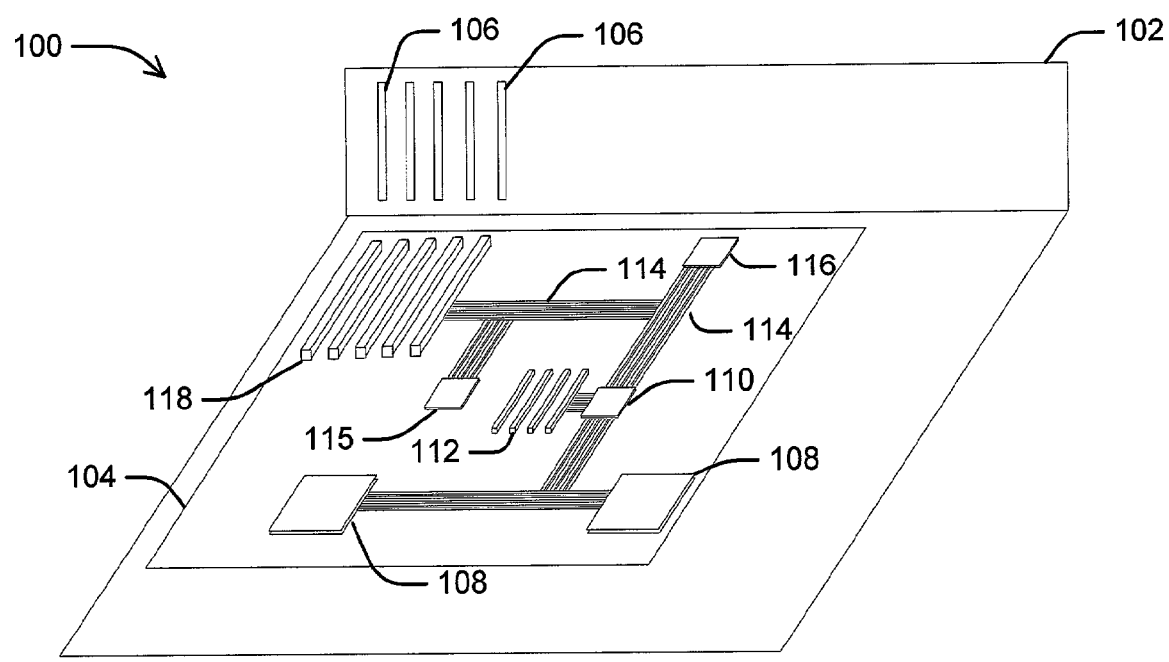
FIG. 1 is a view of an example information handling system.

The present disclosure concerns a method and system for retiring events upon addition or removal of devices. FIG. 1 illustrates one type of information handling system, a microprocessor-based computer, in which the disclosed system and method can be employed. The computer is designated generally as 100. The computer components are contained in a case or cabinet 102. A motherboard 104 is located inside the case 102 and serves as the printed circuit board or PCB through which the devices that make up the computer 100 communicate. In the rear wall of the case 102 are slots 106 that allow external connections to be made, for example a network interface card mounted on the motherboard 104 can be connected to a network using a network cable. Additional external connections can be included in the computer 100, such as for ports and the power supply (neither shown).

The computer 100 is shown with two processors 108 connected to a bridge or hub 110. In alternate implementations, a computer can have a single processor or more than two processors. Some information handling system implementations do not include a processor. The bridge 110 facilitates communications between the processors 108 and between either processor 108 and the rest of the system. For example, both processors 108 communicate through the bridge 110 with system memory maintained in memory connectors 112. Each memory connector 112 is a board location that can have a memory module mounted therein, but does not require a memory module to be mounted therein. One implementation of system memory is shown in greater detail in FIG. 2A. The processors 108 can initiate operations to determine the current state of a portion of memory (a read operation) and operations to change the state of a portion of memory (a write operation). One factor in reliable operation of the computer 100 is accurate read operations and write operations.

The processors 108 access other devices through a bus 114, for example a PCI SCSI, or PCI-X bus, connected to the bridge 110. On board devices 115 and 116 are directly mounted on the motherboard 104. In one implementation, the on board device 115 is a nonvolatile memory, for example an EEPROM or Electrically Erasable Programmable Read-Only Memory. The nonvolatile memory is programmed to represent a serial number or other identifier that is different from the serial number or other identifier of any other motherboard 104 of that type. This is often referred to as a unique identifier for the motherboard 104. It is possible, however, that the motherboard 104 will have the same unique identifier as a device of another type, for example a memory module or a processor 108. Like the motherboard, the processors 108 can each include a unique identifier stored in nonvolatile memory. In addition to on board devices 115 and 116, the bus 114 can connect the bridge to bus connectors 118. Bus connectors 118 allow devices that have external connectors to be easily added and removed from the system. For example, a sound card could be mounted in one of the bus connectors 118 so that a wire extends through a slot 106 to a speaker. If a more advanced sound card was available, the old sound card could be removed from the bus connector 118 and the new one inserted. Not all devices will include unique identifiers stored in nonvolatile memory. Rather a subset of the devices in the information handling system will have readable unique identifiers. In an alternate implementation, only a subset of the devices having readable unique identifiers will be read and stored.

Figure 2A:
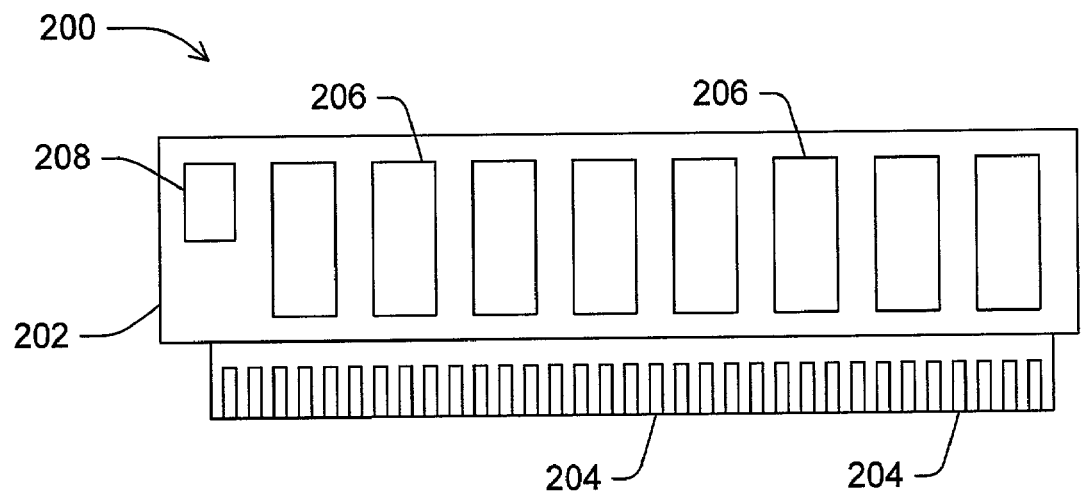
FIG. 2A is a front view of a memory module in accordance with the present invention.

FIG. 2A depicts a front view of a memory module 200 in accordance with the present invention. The memory module 200 is adapted to be inserted in a memory connector 112. The module 200 includes conductive fingers 204 that each couple with a conductive receptor of the memory connector 112. The memory module 200 communicates with other devices in the computer 100 by generating voltages on the conductive fingers 204 (to provide information) and by detecting voltages coupled to the conductive fingers 204 by the conductive receptors (to receive information.) The printed circuit board 202 portion of the memory module includes integrated circuits 206 and a nonvolatile memory 208. The integrated circuits 206 provide memory that is read and written to by the processors 108. Those integrated circuits 206 are often referred to as memory chips. Nonvolatile memory 208 can be an EEPROM or other type of nonvolatile memory. A unique identifier, in the same possible forms as discussed above, is stored in the nonvolatile memory. The nonvolatile memory can also be used to store information other than the unique identifier. The system can read the unique identifier by sending a particular communication to the memory module 200 through the conductive fingers 204. The memory module 200 responds by sending the unique identifier to the bridge 110 through the conductive fingers 204.

Figure 2B:
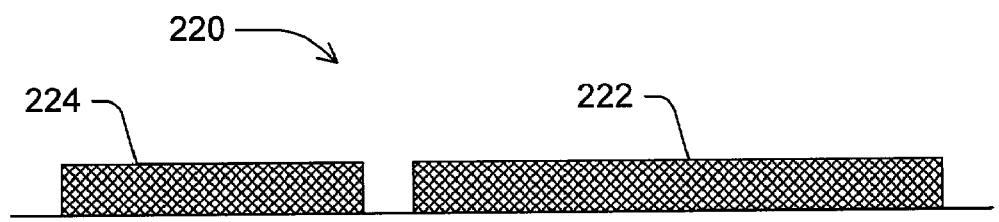
FIG. 2B is a signal diagram of a memory module transfer.

FIG. 2B depicts a signal diagram of a memory module transfer 220. The memory module transfer 220 is shown as cross-hatched blocks indicating a collection a bits. While the signal is shown in linear fashion, many types of memory communicate multiple bits at one time, for example during one bus cycle. The computer 100 interprets a bit based on its position among the multiple bits being communicated. A memory module transfer 220 can include two different portions. A main portion 222 and a verification portion 224. The main portion 222 contains the information being communicated. For example, the main portion 222 can include an address in the memory module 200 that a processor 108 is requesting be read. In the responsive communication the main portion 222 would include the contents of the memory at that address. The verification portion 224 is related to the main portion 22 by a particular function. Examples of a verification portion 224 are checksums and parity checks.

In a memory module transfer 220 from the memory module 200 to the bridge 110, the verification portion 224 is generated at the memory module 200 by applying the function to the main portion 222. At the bridge 110 the function is applied to the main portion 222 and the result is compared to the verification portion 224. If the comparison is not identical, some portion of the transfer 220 was inaccurate and a hardware-detected error results. That error is stored in an entry of the event log. An entry can contain a description of the event, for example parity error, a description of the error location, for example memory slot 2, and an indicator of whether the event is active. An event that is no longer active, for example a processor gets too hot but then cools down, is still useful information even if the error has been corrected. In an alternate implementation, the event log entry can be made inactive by removal.

The memory module 200 is just one example of a device that can have a unique identifier and be associated with hardware-detected errors. Other examples include but are not limited to processors, power supplies, motherboards, and PCI devices. The parity error is just one example of an event that can be associated with a device. Some events are associated with the absence of a device. For example, the absence of a backup power supply from a power supply location could be recorded in the event log.

Figure 3:
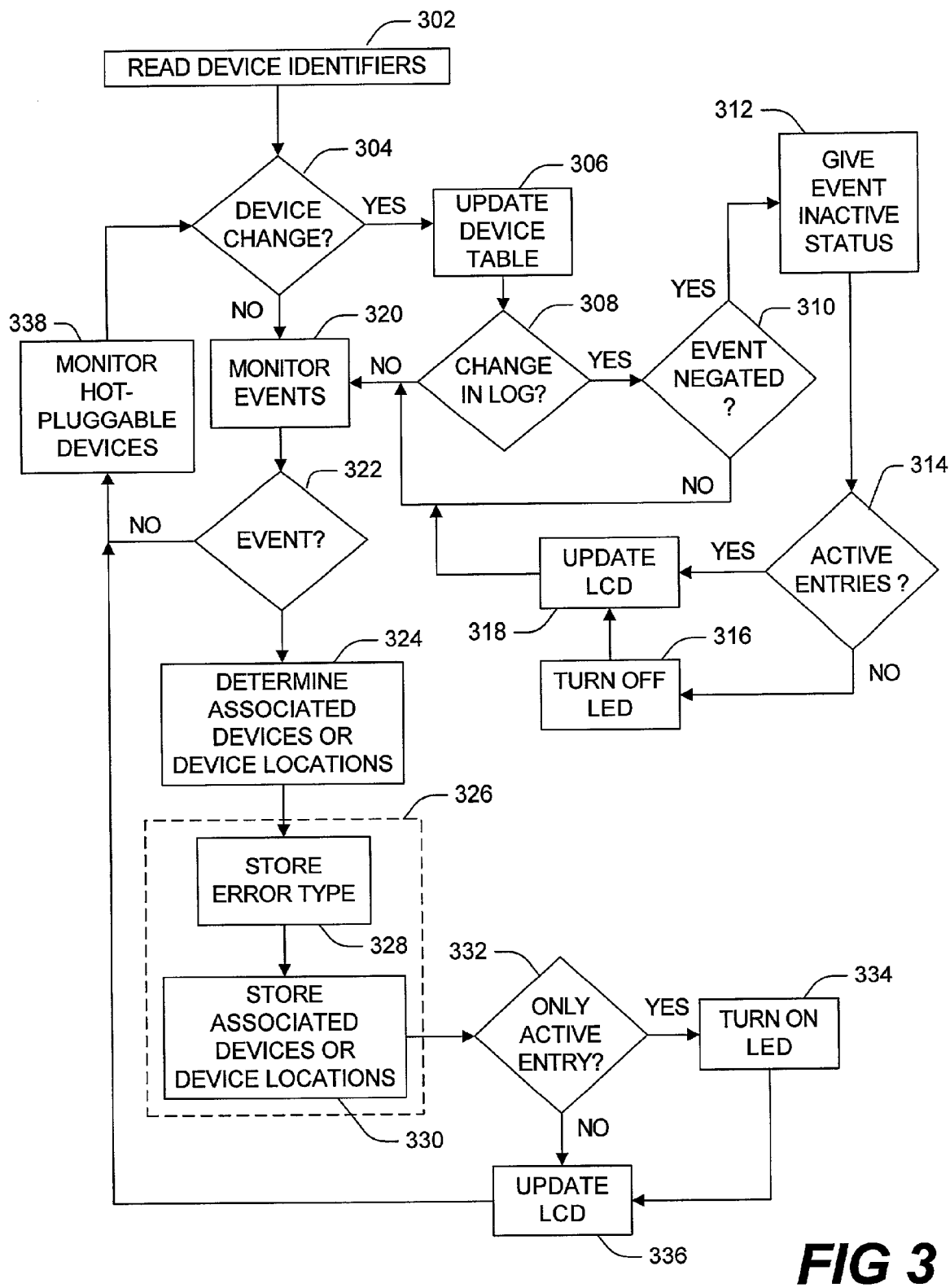
FIG. 3 is a flow diagram of one method of the present disclosure.

FIG. 3 depicts a flow diagram of one method of the present disclosure. The device identifiers are read from device locations in the information handling system 302. The identifiers can be read every time the system boots up or while the system is functioning at regular intervals. In one implementation, the system includes a method of monitoring intrusion while the system is not functioning and the device identifiers are only read if the monitor indicates that the system was opened since the last shutdown. The identifiers read from the current system are compared to a listing of the identifiers for devices present at a previous time to determine if any changes have occurred 304. The identifiers can be listed in accordance with locations in the system. For example, an identifier listed for memory slot 2 corresponds to the memory module mounted in that memory slot. In one implementation, the listing is merely an array of identifiers and empty values that are ordered to reflect device locations.

If a device has changed, as indicated by the change in identifier for a particular device location, the listing is updated 306. The updated listing will allow an accurate determination of whether a change has occurred the next time the identifiers are read. The event log is checked to determine whether any of the events correspond to device locations that have had a change of identifier 308. If an event does correspond to a change of identifier, the event is assessed to determine whether the change negates the event 310. For example, an event might correspond to more than one location and the change in identifier of one location would not negate the event. As another example, an event might correspond to the absence of a device at a location and an identifier at that location would negate the event. Thus, the method can detect both false positives and false negatives that would otherwise occur as a result of an event based on a device that is no longer present or a location that is no longer empty. If the event is negated by the identifier change, the event is given inactive status 312. In one implementation, an active indicator is turned off. In another implementation, the entry is removed from the event log. In another implementation, an additional entry is added to the event log indicating the change in identifier that was detected. With this implementation, an event entry is inactive if the corresponding device was subject to a change entry subsequent to the event entry.

If there are active entries remaining in the event log 314, the system can change the contents of a liquid crystal display (LCD) to remove the negated event 318. If the event given inactive status was the last event, there are no active entries remaining in the event log and an LED that indicates active events can be turned off 316. In addition, the LCD is updated to remove that event. Systems can include an LED, an LCD, neither, or both.

After any change in identifiers is assessed and handled, the system monitors events 320. For example, in a personal computer the BIOS can detect errors associated with the memory, processors, and other devices. If an event occurs 322, the one or more associated device locations or devices are determined 324. Some events may not include associated device locations. For example, an event of high temperature inside the system, but not at a particular device location, would not specify a location. The system's event log can contain both events that have corresponding locations and event that do not. Once the event is detected an entry in the event log is generated 326. This process includes both storing the type of error 328 and storing the corresponding device location(s) or device(s), if there are any 330. If the generated entry is the only active entry 332, the LED that indicates active events is turned on 334. Whether or not the LED is turned on, the LCD is updated to reflect the new entry in the event log 336.

While monitoring for hardware-detected error and other events, the system can also monitor the identifiers of hot-pluggable devices 338. A hot pluggable device is a device that can be installed while the system is functioning. If a hot pluggable-device is added or removed, the change in identifier can be used to update the event log in the same way as if the change occurred while the system was not functioning. The monitoring of hot-pluggable devices can occur periodically or can be instigated by an interrupt.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a plurality of devices, the devices being of one or more types, each device including nonvolatile memory, the nonvolatile memory of each device configured to represent at least an identifier unique among identifiers of other devices of that type among the plurality of devices;
   a first memory segment configured to represent at least an event log, the event log including entries, the entries including identification of an event;
   a second memory segment configured to represent an identifier of a device corresponding to an entry of the event log;
   at least one of the devices being removable; and
   wherein the system is adapted to detect removal of the at least one removable devices and, in response, remove any entries in the event log corresponding only to identifiers of one or more devices that have been removed and
   the identifiers comprise device serial numbers.

2. The information handling system of claim 1, wherein the identifiers represented in the second memory segment are part of the entries in the event log.

3. The information handling system of claim 1, wherein the event log entries include the one or more locations of the devices corresponding to the event.

4. The information handling system of claim 3, wherein the second memory segment is configured to associate the represented identifiers with locations of devices.

5. The information handling system of claim 1, wherein the system is adapted to detect removal by reading identifiers of devices upon startup.

6. The information handling system of claim 5, wherein the system is adapted to read devices upon startup when a chassis intrusion has occurred.

7. The information handling system of claim 1, wherein the system is adapted to detect removal by periodically reading identifiers of devices.

8. The information handling system of claim 1, wherein the event log includes active and inactive entries and removing an entry comprises changing the status of the entry from active to inactive.

9. The information handling system of claim 1 further comprising a display coupled to the event log and adapted to indicate event status.

10. A method of retiring events upon device replacement, comprising the steps of:
    detecting an event;
    updating an event log to include an entry corresponding to the detected event;
    detecting one or more devices corresponding to the event;
    storing an identification of the corresponding devices in the corresponding entry;
    for at least one of the corresponding devices, storing an identifier unique among identifiers of other devices of that type represented by a nonvolatile memory of that corresponding device;
    detecting the removal of the device with the unique identifier; and
    in response to detecting removal, removing any entry in the event log corresponding only to one or more devices that have been removed; and wherein
    the identifiers comprise device serial numbers.

11. The method of claim 10, wherein storing the unique identifier includes storing the unique identifier in the entry of the event log.

12. The method of claim 10, wherein storing the unique identifier occurs during startup.

13. The method of claim 12, wherein the entry of the event log identifies corresponding devices by location.

14. The method of claim 10, wherein detecting removal includes comparing the identifier read from a device position at startup to the identifier read at the same position during the previous startup.

15. The method of claim 14, wherein the identifiers are read from device positions when a chassis intrusion has occurred.

16. The method of claim 10, wherein detecting removal includes comparing the identifier read from a device position at a periodic time to the identifier read at the same position during a previous periodic time.

17. The method of claim 10, wherein the event log includes active and inactive entries and removing an entry is changing an active entry to an inactive entry.

18. The method of claim 10, further including the step of displaying the status of entries in the event log.

19. An information handling system, comprising:
    a first memory module mounted in a first memory socket, the first memory module including nonvolatile memory, the nonvolatile memory of the first memory module configured to represent an identifier unique among identifiers of memory modules in the information handling system;
    a first memory segment configured to represent at least an event log, the event log including an entry identifying an error type, the first memory socket, and an active or inactive status of the event;
    a second memory segment configured to represent an entry containing the identifier of the first memory module; and
    wherein the system is adapted to detect removal of the first memory module and, in response, modify the entry in the event log to indicate inactive status and
    the identifiers comprise device serial numbers.

20. The information handling system of claim 19, further comprising error status registers adapted to detect that errors caused by the first memory module correspond to the first memory socket.

21. The information handling system of claim 19, wherein the memory status registers are coupled to the first memory segment and the event log records entries with device locations detected by the error status registers.

* * * * *